(12) United States Patent
Fullam et al.

(10) Patent No.: US 10,241,587 B2
(45) Date of Patent: Mar. 26, 2019

(54) MAGNETIC TRACKER POWER DUTY CYCLING

(71) Applicant: Microsoft Technology Licensing, LLC., Redmond, WA (US)

(72) Inventors: Scott Francis Fullam, Palo Alto, CA (US); Lev Cherkashin, Redmond, WA (US); Steven James Velat, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 15/499,628

(22) Filed: Apr. 27, 2017

(65) Prior Publication Data
US 2018/0181207 A1 Jun. 28, 2018

Related U.S. Application Data

(60) Provisional application No. 62/438,311, filed on Dec. 22, 2016.

(51) Int. Cl.
*G06F 3/01* (2006.01)
*G02B 27/01* (2006.01)
(Continued)

(52) U.S. Cl.
CPC .............. *G06F 3/017* (2013.01); *G01B 7/30* (2013.01); *G06F 1/163* (2013.01); *G06F 1/325* (2013.01);
(Continued)

(58) Field of Classification Search
CPC . G06F 3/017; G02B 27/0172–27/0179; G06T 19/006
See application file for complete search history.

(56) References Cited

U.S. PATENT DOCUMENTS 6,064,749 A 5/2000 Hirota et al.
9,319,980 B1 4/2016 Lewkow et al.
(Continued)

FOREIGN PATENT DOCUMENTS

WO 2010058390 A1 5/2010
WO 2012011893 A1 1/2012
(Continued)

OTHER PUBLICATIONS

Roetenberg, e al., "Ambulatory Position and Orientation Tracking Fusing Magnetic and Inertial Sensing", In Proceedings of IEEE Transactions on Biomedical Engineering, vol. 54, Issue 5, May 2007, pp. 883-890.
(Continued)

*Primary Examiner* — Lin Li
(74) *Attorney, Agent, or Firm* — Workman Nydegger (57) ABSTRACT

A mixed-reality system for augmenting spatial sensor device readings comprises a first magnetic sensor device configured to transmit a magnetic field signal at a reduced rate relative to a previous transmission rate. The system also comprises a second magnetic sensor device configured to determine a measurement of the magnetic field signal. The measurement indicates a pose estimation of the first magnetic sensor device. Additionally, the system comprises a third spatial input device configured to acquire pose data of the first spatial input device through means other than the magnetic field signal. Further, the system comprises one or more processors configured to compute a pose of the first magnetic sensor device by at least augmenting the measurement of the magnetic field signal with the pose data acquired by the other spatial input device.

20 Claims, 9 Drawing Sheets

(51) Int. Cl.
| | |
|---|---|
| A63F 13/213 | (2014.01) |
| A63F 13/428 | (2014.01) |
| G06Q 50/10 | (2012.01) |
| G01C 21/36 | (2006.01) |
| H04N 19/139 | (2014.01) |
| G06T 19/00 | (2011.01) |
| G06T 7/80 | (2017.01) |
| G06F 1/16 | (2006.01) |
| G06F 1/3212 | (2019.01) |
| G06F 1/3234 | (2019.01) |
| G06F 3/00 | (2006.01) |
| G01B 7/30 | (2006.01) |
| G06F 1/3215 | (2019.01) |
| G06F 3/0346 | (2013.01) |

(52) U.S. Cl.
CPC .......... *G06F 1/3212* (2013.01); *G06F 1/3215* (2013.01); *G06F 1/3259* (2013.01); *G06F 3/002* (2013.01); *G06F 3/011* (2013.01); *G06F 3/012* (2013.01); *G06F 3/0346* (2013.01); *G06F 2203/0384* (2013.01)

(56) References Cited

U.S. PATENT DOCUMENTS

| | | |
|---|---|---|
| 2006/0244454 A1 | 11/2006 | Gard et al. |
| 2007/0299623 A1 | 12/2007 | Gandelsman et al. |
| 2016/0098095 A1* | 4/2016 | Gonzalez-Banos ..... G06F 3/017 345/156 |
| 2016/0246370 A1* | 8/2016 | Osman .................. A63F 13/428 |
| 2016/0294225 A1 | 10/2016 | Blum et al. |
| 2016/0335802 A1* | 11/2016 | Bradski ................ G06T 19/006 |
| 2017/0059871 A1* | 3/2017 | Hashiba ............. G02B 27/0179 |
| 2017/0173453 A1* | 6/2017 | Huang ................ A63F 13/213 |
| 2017/0213388 A1* | 7/2017 | Margolis .............. H04N 19/139 |
| 2017/0220119 A1* | 8/2017 | Potts ....................... G06F 3/017 |
| 2017/0357873 A1* | 12/2017 | Roimela ............ G01C 21/3679 |
| 2018/0018791 A1* | 1/2018 | Guoyi ....................... G06T 7/80 |
| 2018/0091577 A1* | 3/2018 | Park ........................ G06Q 50/10 |
| 2018/0108179 A1* | 4/2018 | Tomlin ............... G02B 27/0172 |

FOREIGN PATENT DOCUMENTS

| | | |
|---|---|---|
| WO | 2013018038 A1 | 2/2013 |
| WO | 2015168043 A1 | 11/2015 |
| WO | 2016141373 A1 | 9/2016 |

OTHER PUBLICATIONS

Perry, Tekla S., "For Precise Hand Tracking in VirtualReality, Start With a Magnetic Field", http://spectrum.ieee.org/view-from-the-valley/at-work/start-ups/for-precise-hand-tracking-in-virtual-reality-start-with-a-magnetic-field, Published on: Nov. 18, 2016, 1 pages.

Narayanmoorthi, et al., "High Efficiency Tracking Scheme for Magnetic Resonance based Wireless Power Transfer System", In Indian Journal of Science and Technology, vol. 9, Issue 38, Oct. 2016, 12 pages.

\* cited by examiner

Handheld Controller 220

Head Mounted Display 210

MAGNETIC TRACKER POWER DUTY CYCLING

CROSS-REFERENCE TO RELATED APPLICATIONS

This application claims priority to and the benefit of U.S. Provisional Application Ser. No. 62/438,311 entitled "Magnetic Tracker Power Duty Cycling", filed on Dec. 22, 2016, which is incorporated by reference herein in its entirety.

BACKGROUND

Computers and computing systems have impacted nearly every aspect of modern living. Computers are generally involved in work, recreation, healthcare, transportation, entertainment, household management, etc.

Mixed-reality computer systems, including virtual-reality systems and augmented-reality systems, have recently received significant interest for their ability to create immersive experiences for users. Conventional augmented-reality systems create an augmented reality scenario by visually presenting virtual objects in the real world. In contrast, conventional virtual-reality systems create a more immersive experience such that a user's entire view is obstructed by a virtual world. As used herein, mixed-reality, augmented-reality, and virtual-reality systems are described and referenced interchangeably. In general, however, "mixed-reality" will be used to broadly describe the various technologies. Unless specifically stated or unless specifically required, as understood by one of skill in the art, the descriptions herein apply equally to any type of mixed-reality system, including augmented-reality systems, virtual-reality systems, and/or any other similar system capable of displaying virtual objects to a user.

Continued advances in hardware capabilities and rendering technologies have greatly increased the realism of virtual objects and scenes displayed to a user within a mixed-reality environment. For example, in mixed-reality environments, virtual objects can be placed within the real world in such a way as to give the impression that the virtual object is part of the real world. As a user moves around within the real world, the mixed-reality environment automatically updates so that the user is provided with the proper perspective and view of the virtual object; this mixed-reality environment is referred to as a scene.

Immersing a user into a mixed-reality environment creates many challenges and difficulties that extend beyond the mere presentation of a scenario to a user. For example, there is significant interest in the field regarding technologies that allow a user to interact with virtual objects in a mixed-reality scenario. Various systems and methods are used to provide this interactive ability to the users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a computer system for augmenting spatial sensor device readings. The computer system causes a first spatial input device to transmit a tracking signal at a reduced rate. Additionally, the computer system causes a second spatial input device to determine a measurement of the tracking signal. The computer system also uses another spatial input device to acquire pose data of the first spatial input device. The computer system then computes a pose of the first spatial input device by at least augmenting the measurement of the tracking signal with the pose data acquired by the other spatial input device.

Additionally, disclosed embodiments include a method for augmenting spatial sensor device readings. The method includes receiving an indication that adjusting an output associated with a first spatial input device will improve a system characteristic. The method also includes causing the first spatial input device to operate at an adjusted output. Additionally, the method includes causing another spatial input device to acquire pose data of the first spatial input device. Further, the method includes computing a pose of the first spatial input device by at least augmenting measurements received from the first spatial input device with the pose data acquired by the other spatial input device.

Disclosed embodiments also include a mixed-reality system for augmenting spatial sensor device readings. The system comprises a first magnetic sensor device configured to transmit a magnetic field signal at a reduced rate relative to a previous transmission rate. The system also comprises a second magnetic sensor device configured to determine a measurement of the magnetic field signal. The measurement indicates a pose estimation of the first magnetic sensor device. Additionally, the system comprises a third spatial input device configured to acquire pose data of the first spatial input device through means other than the magnetic field signal. Further, the system comprises one or more processors configured to compute a pose of the first magnetic sensor device by at least augmenting the measurement of the magnetic field signal with the pose data acquired by the other spatial input device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the teachings contained herein. Features and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Embodiments disclosed herein include systems, computer-readable media, and methods for augmenting spatial sensor device readings. In at least one disclosed embodiment, a mixed-reality system adjusts an output associated with a spatial input device. The adjusted output may result in an improved operating characteristic of the mixed-reality system. For example, the mixed-reality system may reduce the transmit rate of a magnetic sensor device in order to conserve power. Reducing the transmission rate, however, may also reduce the accuracy of the readings. To compensate for the reduced accuracy, the mixed-reality system can augment pose readings from the magnetic sensor device with tracking date from another, more energy efficient sensor. Accordingly, disclosed embodiments are capable of automatically adjusting outputs from spatial input devices in ways that optimize the overall performance of the mixed-reality system.

As used herein, "magnetic-sensor devices" and "on-body devices" are used interchangeably. More specifically, on-body devices are used as examples of magnetic sensor devices that can be configured to perform various embodiments disclosed herein. One will appreciate that the scope of embodiments disclosed herein is not limited to particular forms or devices, but can, instead, be implemented in a variety of different embodiments that extend beyond on-body devices. Additionally, as used herein, a secondary communication channel comprises a communication channel other than the measurement of magnetic field to determine pose. For example, the secondary communication channel may comprise BLUETOOTH, WIFI, or any other communication standard that allows for the two-way transfer of data. Additionally, as used herein a magnetic sensor device comprises a device that is capable of emitting and/or receiving magnetic field signals.

Disclosed embodiments overcome many deficiencies prevalent throughout the conventional technology. For example, disclosed embodiments provide accurate pose data while at the same time optimizing battery life. As mixed-reality systems become increasingly mobile, there will be growing pressure to reduce the weight and size of the mixed-reality system. In many systems, batteries are a major addition to the overall bulk and weight of the mixed-reality system. As battery size shrinks to accommodate smaller, lighter systems, there will be a growing need to provide methods and systems that extend the battery life of components within the mixed-reality system.

The following discussion may refer to a number of methods and method acts that may be performed. Although the method acts may be discussed in a certain order or illustrated in a flow chart as occurring in a particular order, no particular ordering is required unless specifically stated, or required, because an act is dependent on another act being completed prior to the act being performed.

Figure 1:
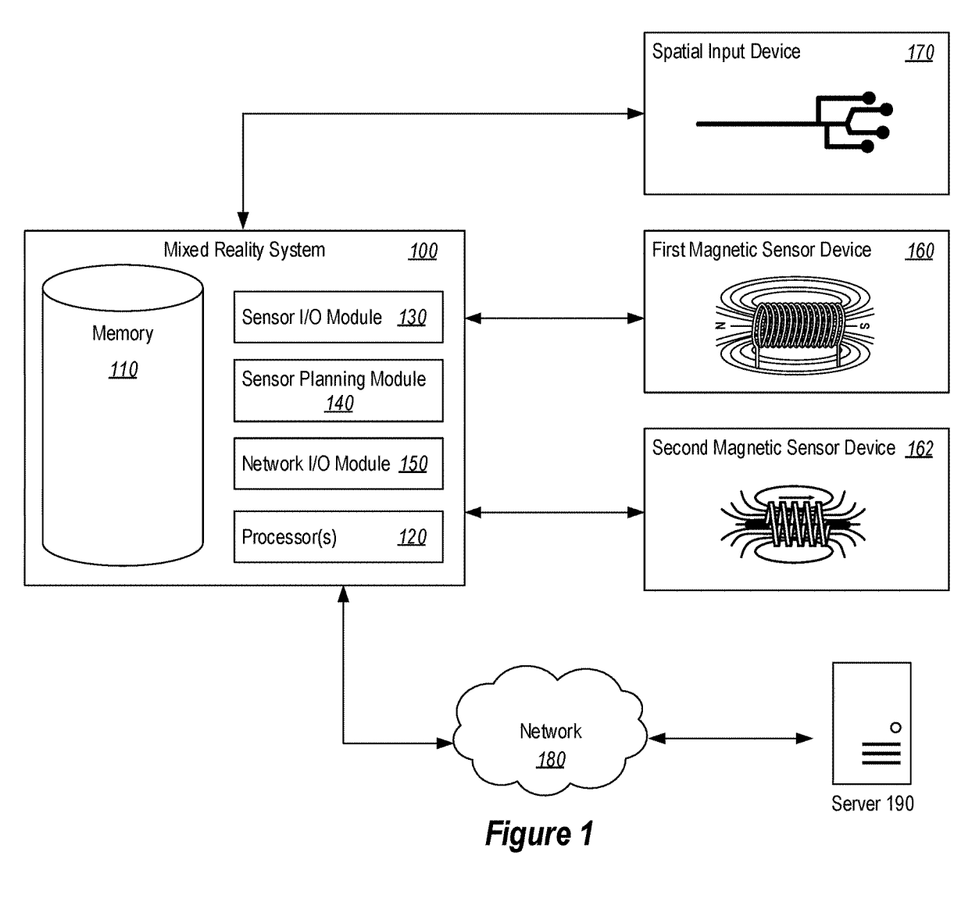
FIG. 1 illustrates a schematic diagram of an embodiment of a mixed-reality system and associated devices.

Initially, FIG. 1 illustrates a schematic diagram of an embodiment of a mixed-reality system 100 that is in communication with a first magnetic sensor device 160, a second magnetic sensor device 162, a spatial input device 170, a network 180, and a server 190. As used herein, a spatial input device comprises any device that uses spatial positioning and/or motion of a user to gather input. As such, the first magnetic sensor device 160 and the second magnetic sensor device 162 are examples of spatial input devices. Other examples of spatial input devices include, but are not limited to, a camera, an inertial measurement units ("IMU"), a LIDAR, a GPS unit, accelerometers, gyroscopes, sonars, depth sensors, and other devices capable of capturing position and/or motion data from a user. In many cases herein, a particular type of spatial input device will be recited, but it should be understood that a more general spatial input device could be interchangeably used. One will appreciate that the various modules, components, and devices shown in FIG. 1 and throughout this application are provided for the sake of example and explanation. In additional or alternate embodiments, the mixed-reality system 100 may include a different combination of modules, components, and devices.

The depicted mixed-reality system 100 includes one or more processor(s) 120 and memory 110. The one or more processor(s) 120 and memory 110 may be representative of hardware components and/or software components. The mixed-reality system 100 also includes a sensor I/O module 130, a pose computing module 140, and a network I/O module 150. In at least one embodiment, the sensor I/O module 130 communicates with one or more spatial input devices that provide sensor information useful for generating a mixed-reality environment. The one or more spatial input devices comprise spatial input device 170, first magnetic sensor device 160, and second magnetic sensor device 162. The first magnetic sensor device 160 and the second magnetic sensor device 162 are configured to track a pose of a user within a mixed-reality environment. The sensor I/O module 130 may also communicate with one or more cameras, depth sensors, LIDARs, accelerometers, gyroscopes, sonars, and any other sensors useful within a mixed-reality environment.

The first magnetic sensor device 160 may be embedded within a mixed-reality headset and the second magnetic sensor device 162 may be embedded within a handheld controller. As the user moves the handheld controller around within the mixed-reality environment, the mixed-reality system 100 causes the first magnetic sensor device 160 to transmit a known magnetic field signal. The mixed-reality system 100 also causes the second magnetic sensor device 162, within the handheld controller, to measure variations in the magnetic field signal as the handheld controller is moved between different positions. The second magnetic sensor device 162 communicates these measured variations to the sensor I/O module 130. The one or more processor(s) 120 are then able to determine the relative measured variations. One will appreciate that in at least one embodiment the second magnetic sensor device 162 generates magnetic field signals that the first magnetic sensor device 160 receives.

In various additional or alternative embodiments, the mixed-reality system 100 also utilizes spatial input device 170 to track the relative pose of the user within the mixed-reality environment. For example, the mixed-reality system 100 may utilize a spatial input device 170 in the form of a camera to track the pose of the handheld controller, and in turn the second magnetic sensor device 162. For example, whenever the handheld controller is within the field-of-view of the camera, the camera may track specific points (e.g., reflectors) that are placed on the handheld controller. Similarly, the handheld controller may comprise an IMU that is able to also provide motion and tracking data relating to the handheld controller. The pose computing module 140 is capable of choosing to rely upon a particular sensor for computing pose or to rely upon a combination of multiple sensors to compute pose. As such, in at least one embodiment, the pose computing module 140 can gather pose data from the handheld controller using the integrated second magnetic sensor device 162, an integrated IMU, an external camera, and/or any number of other different spatial input devices.

In at least one embodiment, the network I/O module 150 communicates with the server 190 through a network 180. The network I/O module 150 receives data that is associated with the particular mixed-reality environment that the user is within and, in some cases, receives data related to other mixed-reality systems that are in the vicinity of mixed-reality system 100. For example, the mixed-reality system 100 may receive an indication that another mixed-reality system is being used in the same room. The indication may also comprise information about the current state of the other mixed-reality system's sensors and communication states. Using this information, the mixed-reality system 100 can adjust the output of various spatial input devices to optimize the performance of the mixed-reality system.

Figure 2:
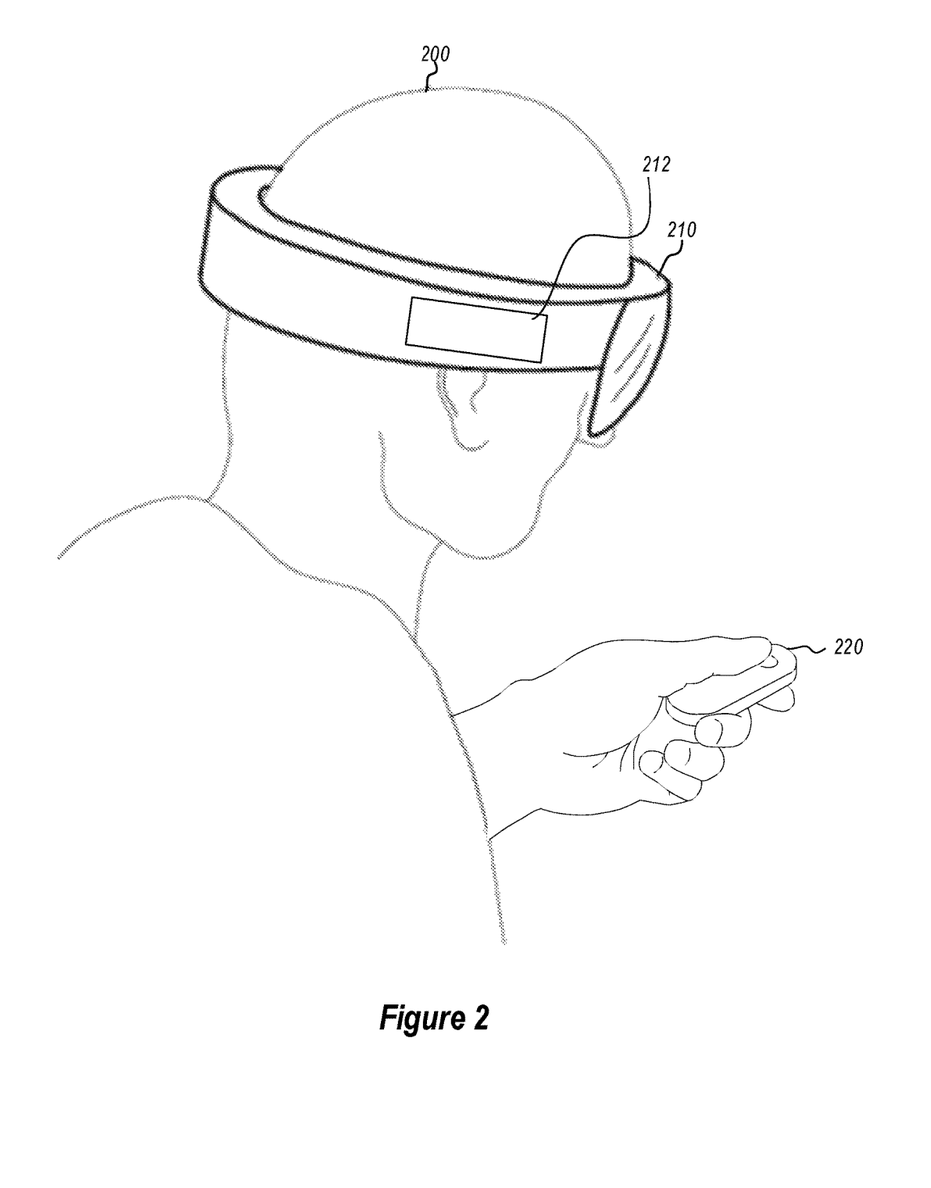
FIG. 2 illustrates an embodiment of mixed-reality devices being used by a user.

FIG. 2 illustrates an embodiment of mixed-reality devices being used by a user 200. The mixed-reality system depicted in FIG. 2 includes a head-mounted display ("HMD") 210 positioned on a user 200. In the depicted embodiment, the HMD 210 is associated with a mixed-realty system 100 like that described in FIG. 1. Additionally, the HMD 210 includes at least one sensor unit 212 that gathers sensor information relating to the mixed-reality environment. One of skill in the art will recognize that the depicted system can analogously be used within mixed-reality, augmented reality, virtual reality, or any other similar endeavor.

FIG. 2 also depicts a handheld controller 220. The handheld controller 220 comprises one or more integrated spatial input devices. Although FIG. 2 illustrates only a single handheld controller 220, embodiments of the present invention are not limited solely to those devices depicted in FIG. 2. For instance, embodiments of the present invention can be configured to simultaneously utilize many on-body devices. Even further, the on-body devices need not merely be handheld or head-mounted. For instance, embodiments of the present invention can be configured to utilize any type of on-body device (e.g., a device mounted on a user's foot, a device mounted on a user's torso, etc.). Additionally, embodiments disclosed herein can also be practiced outside of mixed-reality environments. For example, a user may control a conventional computer using systems, methods, and apparatuses disclosed herein.

The handheld controller 220 may include one or more IMUs. By manipulating the handheld controller 220, the user 200 can interact with the mixed-reality environment and provide user input to the HMD 210. This input can include, for example, controlling and moving virtual objects included within the mixed-reality scenario. A wide variety of user input can be provided. Accordingly, FIG. 2 presents a wearable mixed-reality system 100 that utilizes handheld and head-mounted devices. Together, these devices (i.e. the HMD 210 and the handheld controller 220) enable a user to precisely and rapidly control the mixed-reality computing system.

On-body devices, such as the handheld controller 220 depicted in FIG. 2, comprise magnetic sensor devices that use a magnetic field signal to allow measurement of the pose of the handheld controller 220 with respect to a sensor unit 212 in the HMD 210. In at least one embodiment, the magnetic field signal, the HMD 210, and the handheld controller 220 work in unison to determine how the handheld controller 220 is oriented/situated in relation to the HMD 210 (i.e. its "pose"). Determining the handheld device's pose with respect to the HMD 210 enhances the mixed-reality scenario that is presented to the user 200.

For instance, suppose the mixed-reality computing system 100 presents a scenario in which a user 200 has a virtual object (e.g., a gun, laser, watch, etc.) attached to his/her arm. This scenario may be designed to allow the user 200 to use the virtual object to advance through stages of the scenario (e.g., perhaps the user is to use the gun to fight villains). As a result, the user 200 will move and interact with the images depicted in the scenario. The virtual object should move in unison with the user's movements. Indeed, to provide an enhanced experience, the virtual object should follow the user's specific arm movements. Accordingly, accurate pose positioning of the virtual object (which is accomplished through the communications between the HMD 210 and the handheld controller 220) will better enable the user 200 to advance through the various stages of the scenario.

Figure 3:
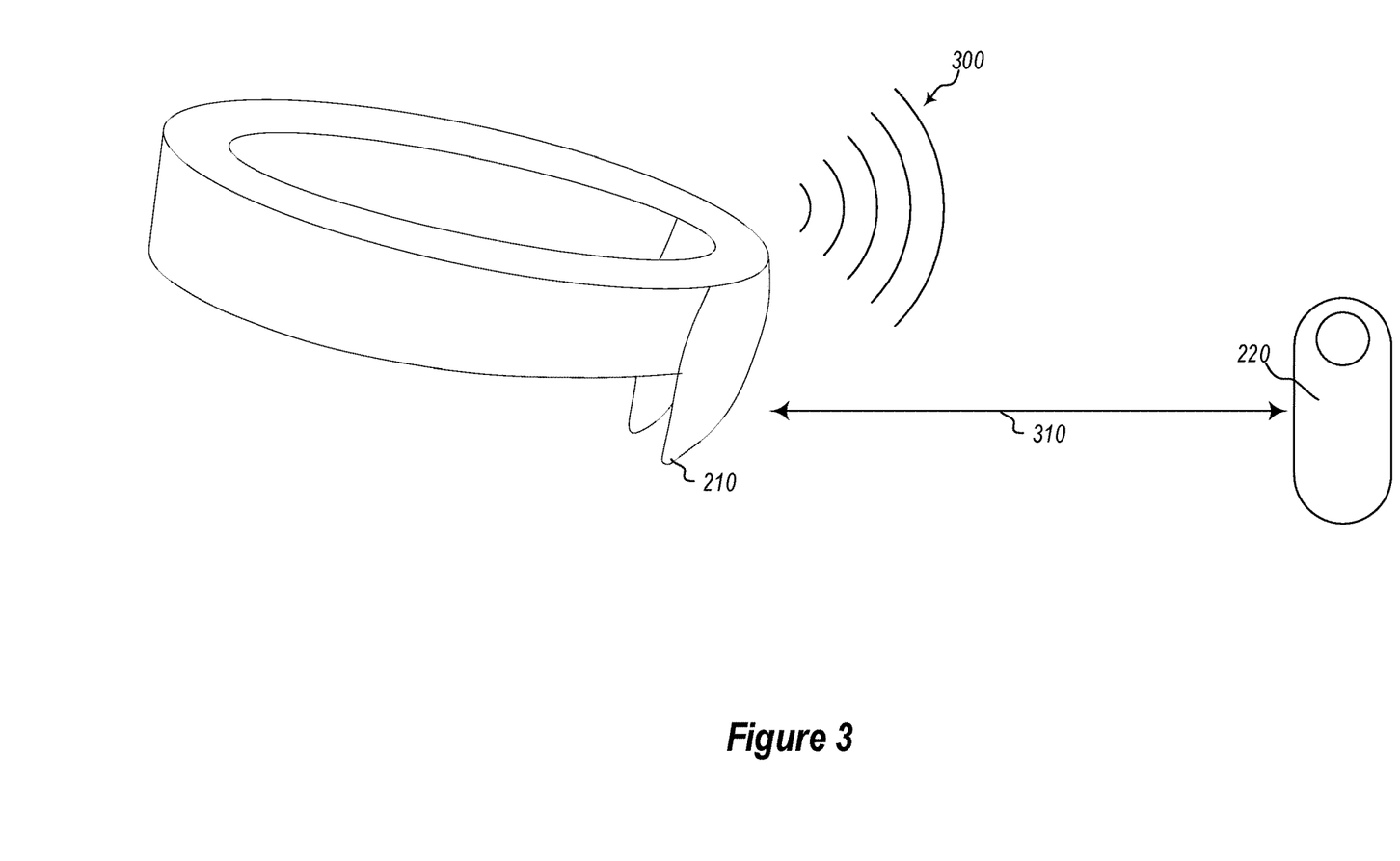
FIG. 3 illustrates a schematic diagram of an embodiment of mixed-reality devices communicating with each other.

FIG. 3 provides a high-level overview of how the mixed-reality computing system determines an on-body device's pose. For instance, FIG. 3 illustrates a schematic diagram of an embodiment of spatial input devices communicating with each other. In the depicted embodiment, the mixed-reality system 100 operates by having at least one of the spatial input devices (e.g., the HMD 210) transmit a magnetic field signal 300. While the HMD 210 is transmitting the magnetic field signal 300, a different spatial input device (e.g., the handheld controller 220) will measure the received magnetic field signal. The pose of the on-body device (e.g., the handheld controller 220) can then be computed using the near field fall off relationship and the measured characteristics of the magnetic field signal 300.

FIG. 3 also illustrates that a secondary communication channel 310 can be maintained between the two devices. The secondary communication channel 310 is used to communicate data between the two devices and to synchronize other communications between the various devices of the mixed-reality system 100. The secondary communication channel 310 may be different than the channels used to transmit the magnetic field signal. For instance, the secondary communication channel 310 can be in the form of a BLUETOOTH™ channel.

Figure 4:
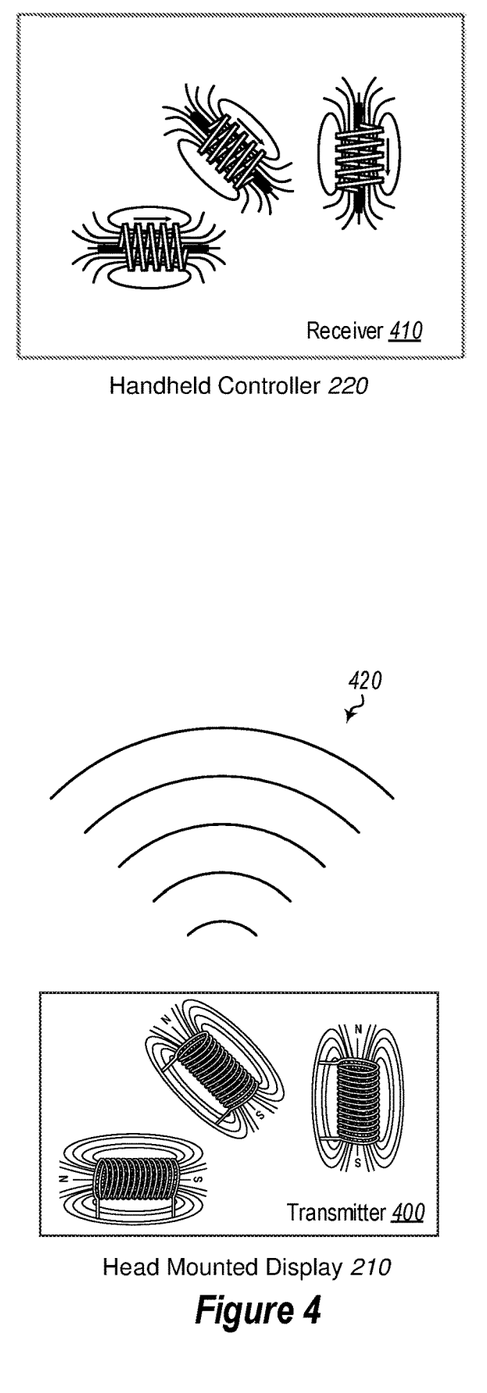
FIG. 4 illustrates a schematic diagram of another embodiment of mixed-reality devices communicating with each other.

FIG. 4 presents an alternative depiction of the spatial input devices of a mixed-reality system 100. For instance, FIG. 4 illustrates a schematic diagram of another embodiment of spatial input devices communicating with each other. In particular, a transmitter 400 is depicted emitting a magnetic field signal 420 to a receiver 410. The transmitter 400 may be embedded within an HMD 210. The receiver 410 may be embedded within a handheld controller 220. In at least one additional or alternative embodiment, the HMD 210 and/or the handheld controller 220 comprises magnetic transceivers that are capable of both emitting and receiving magnetic field signals.

Although not shown in the figures, the HMD 210 (and even the other on-body devices) may include other spatial input devices as well. To illustrate, the HMD 210 can include one or more cameras (e.g., color and/or black and white), depth sensors, infrared sensors, accelerometers, gyroscopes, magnetometers, etc. These other spatial input devices can be used for a variety of reasons. By way of example and not limitation, the spatial input devices of the mixed-reality system 100 can be used to detect objects in an environment in which the system is being operated. Not only can the mixed-reality system 100 use the spatial input devices to detect the objects, the mixed-reality system 100 can also use the spatial input devices in an attempt to identify what those objects actually are.

For instance, suppose the user 200 from FIG. 2 was using the mixed-reality system 100 in a living room. Most living rooms have a variety of objects included therein (e.g., couches, tables, lamps, etc.). Using its spatial input devices, the mixed-reality system 100 detects and identifies those living room objects. Even further, the mixed-reality system 100 can use those objects to develop and present a mixed-reality scenario to the user 200 (e.g., the mixed-reality system 100 can show the couch as being on fire, or a villain breaking through a wall).

As suggested above, the on-body devices (e.g., the handheld controller 220 from FIG. 2) can also include these spatial input devices. As a result, the HMD 210 and the various on-body devices can be used to understand the environment and to create a working model of that environment. Once this model is created, the mixed-reality system 100 tracks the objects and uses the environment to create a better mixed-reality scenario. As indicated before, a depth sensor can be used to understand depth of objects in the environment and can facilitate in the process of identifying what those objects are. Accordingly, using its spatial input devices, a mixed-reality system 100 can generate a working model of an environment and use that model to enhance any mixed-reality scenarios.

While the above discussion focused on the use of on-body devices (e.g., the HMD 210 and handheld device 220) to transmit and receive the magnetic field signal, different embodiments of the present invention can utilize other spatial input devices to transmit and receive the magnetic field signal. Indeed, some situations may desire greater flexibility in determining which spatial input devices are used to transmit or receive the magnetic field signal. For instance, instead of an on-body device or the HMD 210 transmitting the magnetic field signal, a tablet or other computing system may be used to transmit the signal.

For example, a user within a mixed-reality environment may be using a drafting program to design an engine. At different portions of the design process, it may be beneficial to seamlessly switch from interacting with a three-dimensional model within the mixed-reality environment to working on the computer in a two-dimensional model. In at least one embodiment, a handheld controller 220 transmits magnetic field signals to an HMD 210 while the user is working on the three-dimensional model. The handheld controller 220 then automatically begins to receive magnetic field signals generated by the computer when the user is working on the two-dimensional model. As such, the user can utilize the same handheld controller 220 to interact with both the three-dimensional model via the HMD 210 and the two-dimensional model on the computer.

Figure 5:
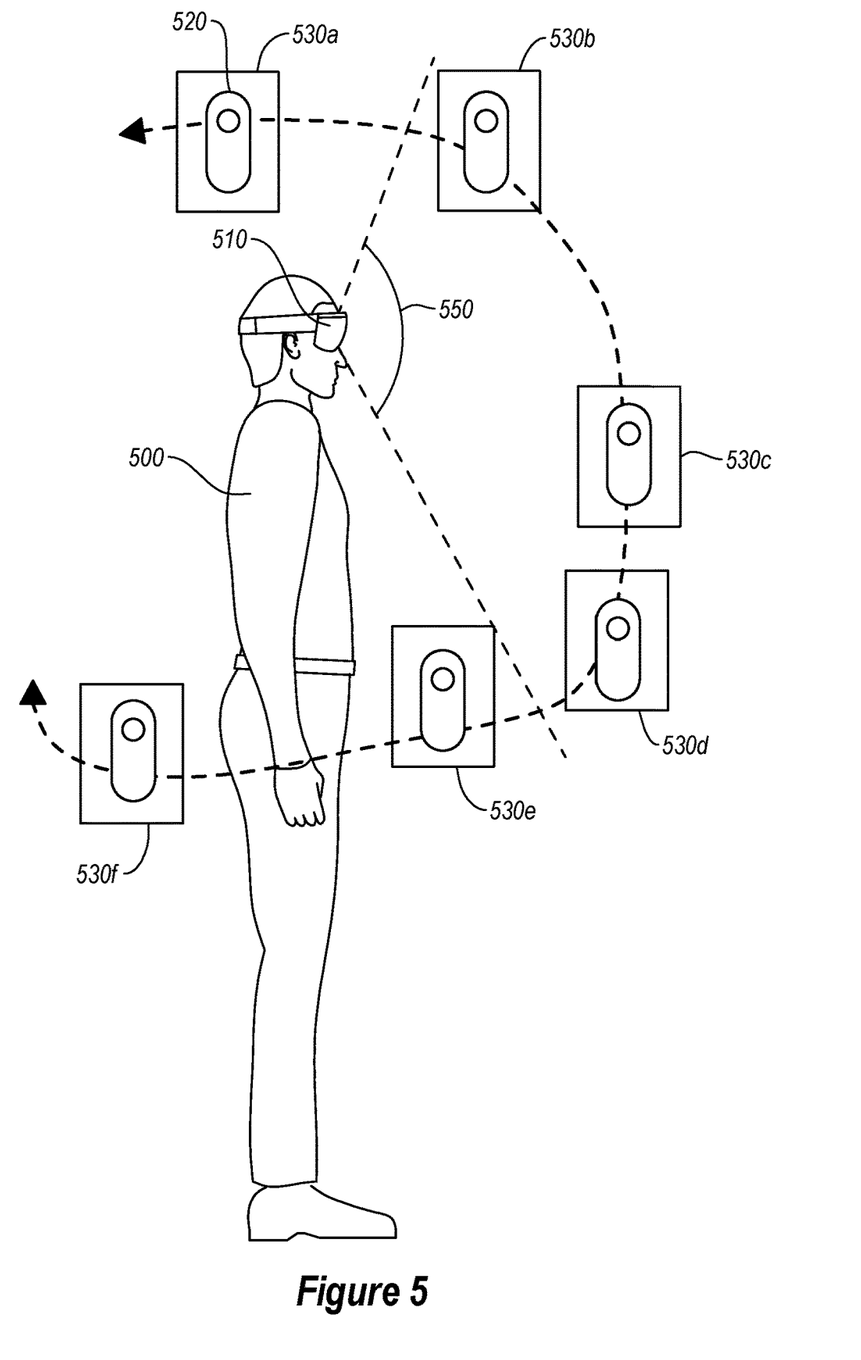
FIG. 5 illustrates a user using embodiments of spatial input devices within a mixed-reality environment.

FIG. 5 illustrates a user 500 using embodiments of spatial input devices within a mixed-reality environment. As depicted, the user is using a HMD 510 and a handheld controller 520. Both the HMD 510 and the handheld controller 520 comprise one or more spatial input devices. For example, the handheld controller 520 comprises one or more magnetic sensor devices and one or more IMUs. In contrast, the HMD 510 comprises one or more magnetic sensor devices and a camera.

The user 510 is shown moving the handheld controller 520 along a pathway that passes through positions 530(a-f). Each position 530(a-f) represents a location where the magnetic sensor device within the handheld controller 520 emits a magnetic field signal. One will understand, however, that in practice a magnetic sensor device may emit signals at a rate that far exceeds the exemplary rate depicted in FIG. 5. The positions 530(a-f) of FIG. 5 are arbitrarily chosen for the sake of example and clarity.

In at least one embodiment, the mixed-reality system 100 (shown in FIG. 1) is capable of adjusting various characteristics of a spatial input device's output based upon the desired performance of the mixed-reality system 100. For example, the mixed-reality system 100 may determine that the battery power available to the handheld controller 520 has dropped below a predetermined threshold. Additionally, in at least one embodiment, the mixed-reality system 100 receives an indication that adjusting an output associated with a spatial input device will improve a system characteristic. For example, the mixed-reality system 100 may receive an indication that the magnetic field signal band is overly congested, either due to the use of handheld controller 520 or due to the use of other magnetic sensor device by other mixed-reality systems.

For example, in at least one embodiment, the mixed-reality system 100 determines that a single-to-noise ratio ("SNR") associated with the magnetic field signal is below a predetermined threshold. The mixed-reality system 100 then causes the first spatial input device to transmit the tracking signal at the reduced rate. As used herein a tracking signal comprises any emitted signal that is useable by a spatial tracking device to identify pose. For example, in at least one embodiment, a magnetic field signal is a type of tracking signal.

One will appreciate that in a scenario where multiple magnetic sensor devices are emitting magnetic signals, the available bandwidth may become overly congested. The congested bandwidth, and general noise, can reduce the SNR of magnetic field signals within the environment. In at least one embodiment, the mixed-reality system 100 receives a notification regarding one or more other magnetic sensor devices within a common operating environment as the first magnetic sensor device. Based upon the received notification, the mixed-reality system 100 can determine that an availability of communication bandwidth associated magnetic field signals is below a threshold. The mixed-reality system 100 can then cause the magnetic sensor device to transmit the magnetic field signal at the reduced rate. Reducing the transmit rate of one of more magnetic sensor devices can relieve pressure on the available bandwidth and allow the SNR to increase, albeit at a reduced sampling rate.

In response to determining that it would be beneficial to adjust an output of the handheld controller 520, the sensor I/O module 130 (shown in FIG. 1) causes a first spatial input device, such as the magnetic sensor device in the handheld controller 520, to adjust its output by, for example, transmitting at a reduced rate. The reduced rate may be a predetermined reduced rate or may be dynamically calculated based upon the particular optimization. For example, the rate reduction may be increase as the battery life of the handheld controller 520 declines.

In at least one embodiment, adjusting the output of the first spatial input device comprises switching the first spatial input device between a high-power mode and a low-power mode. For example, the magnetic sensor device within the handheld controller 520 may be capable of operating at a variety of different power levels. Higher power levels may transmit higher amplitude magnetic field signals, while lower power levels may transmit lower amplitude magnetic field signals. A high-power mode may comprise a predetermined power level, while a low-power mode may comprise a predetermined lower power level. In contrast, in at least one embodiment, a high-power mode comprises a mode with a high transmit rate, while a low-power mode comprises a mode with a low transmit rate. Further, in at least one embodiment, a low-power mode comprises turning a particular spatial input device off. The high-power mode, in turn, would comprise turning the spatial input device on. As such, spatial input devices within the mixed-reality system are capable of operating at a variety of different power modes that can be selectively adjusted to optimize the performance of the system.

Once the output of the magnetic sensor device in the handheld controller 520 has been changed, the sensor I/O module 130 causes a second spatial input device, such as a magnetic sensor device within HMD 510, to determine a measurement of a tracking signal (e.g., the magnetic field signal emitted by the handheld controller 520). In this exemplary case, the HMD 510 acquires a magnetic field signal from the handheld controller 520 at a lower rate than the handheld controller 520 was previously transmitting. Due to the reduced rate at which the handheld controller 520 is emitting a magnetic field signal, the estimated pose calculated by the pose computing module 140 (shown in FIG. 1) may be less accurate than a pose computed based upon a higher transmit rate.

In at least one embodiment, to compensate for the less accurate estimated pose, the mixed-reality system 100 uses another spatial input device to acquire pose data of the first spatial input device 520. For example, the sensor I/O module 130 may also receive pose data from a camera that is integrated within HMD 510. FIG. 5 depicts a field-of-view 550 associated with the camera in the HMD 510. During times when the handheld controller 510 is within the field-of-view 510, the pose computing module 140 receives pose data relating to the pose of the handheld controller 510. For instance when the handheld controller 510 is at positions 530(*b-d*), the handheld controller 510 is within the field-of-view and the pose computing module 140 is able to compute a pose of the handheld controller 510 by at least augmenting the measurement of the reduced rate magnetic field signal with the pose data acquired by the camera.

Further, in at least one embodiment, when the handheld controller 520 is at positions 530*a*, 530*e*, and 530*f*, the handheld controller 520 is outside the field-of-view and the camera is unable to provide pose data relating to the handheld controller 520. In this situation, an IMU that integrated within the handheld controller 520 is able to provide pose data to the sensor I/O module 130 and in turn the pose computing module 140. Similar to the use pose data from the camera, the pose computing module 140 is able to compute a pose of the handheld controller 510 by at least augmenting the measurement of the reduced rate magnetic field signal with the pose data acquired by the IMU.

Similarly, in at least one embodiment, the mixed-reality system 100 may receive a request for low-accuracy sensor readings. Such a request may be generated when the user has positioned the handheld controller 520 behind the user's back or when the user is performing broad, sweeping motions. In such cases, the mixed-reality system 100 may assume that the user is not using the handheld controller 520 to perform highly sensitive actions. Accordingly, the mixed-reality system 100 causes the magnetic sensor device within the handheld controller 520 to transmit the magnetic field signal at a reduced rate.

Further, in at least one embodiment, the mixed-reality system 100 receives a communication from a mixed-reality processing unit, through a secondary channel, that request a particular level of sensor sensitivity. For example, the user may be interacting with a mixed-reality program that is used by doctors training for surgery. During particularly sensitive parts of the surgery it is important that the doctor's actions are accurately reflected in the mixed-reality environment. As such, a mixed-reality processing unit associated with the mixed-reality program requests for a particular level of sensor sensitivity. Based upon the requested particular level of sensor sensitivity, the mixed-reality system 100 calculates an adjusted output for the spatial input device in the form of a particular rate.

One will appreciate that the above examples are provided only for the sake of clarity and explanation. In various additional or alternative embodiments, the mixed-reality system may utilize a variety of different sensors and combinations of sensors to augment the measurement of a tracking signal that is used to compute a pose. For example, in at least one embodiment, the mixed-reality system 100 uses both the IMU and the camera simultaneously to augment the magnetic field signal (i.e., the tracking signal). Further, during time periods when the handheld controller 520 is within the field-of-view 550, the mixed-reality system 100 increases the power provided to the camera and decrease the power provided to the IMU. In contrast, when the handheld controller is outside of the field-of-view, the mixed-reality system 100 decreases the power provided to the camera and increases the power provided to the IMU.

Figure 6:
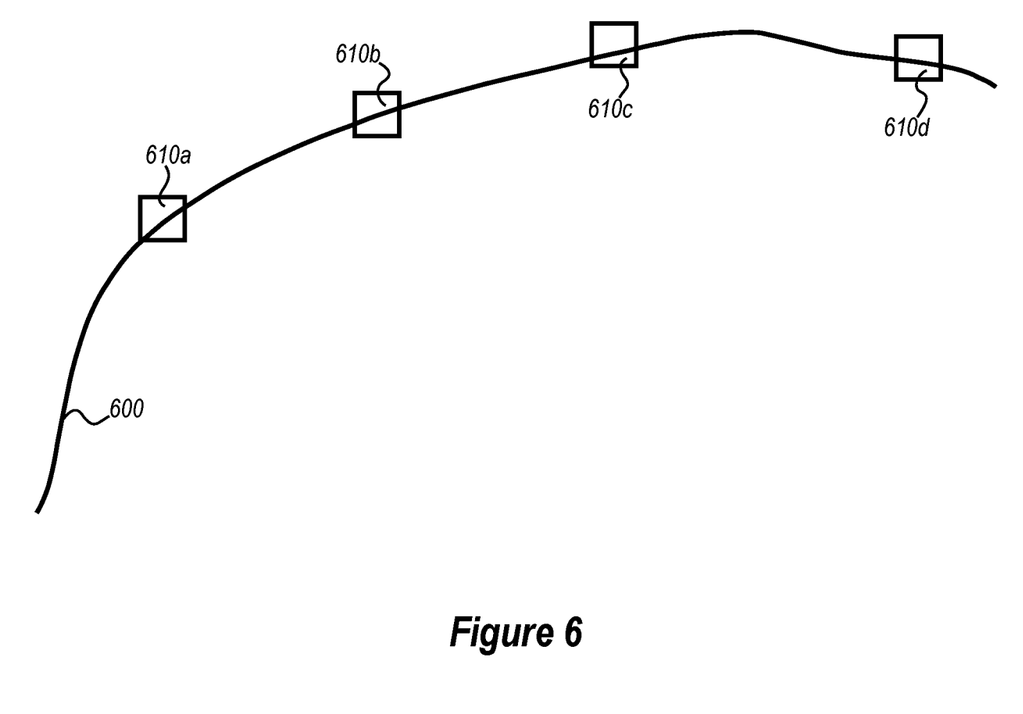
FIG. 6 illustrates a chart of an embodiment of a transmission rate that a device follows when transmitting a magnetic field signal.

FIG. 6 illustrates a chart of an embodiment of a transmission rate that a device follows when transmitting a magnetic field signal. In particular, FIG. 6 depicts a motion path 600 of the magnetic sensor device in the handheld controller 510. To accurately determine the handheld controller's pose, the sensor I/O module 130 collects transmission data at a determined frequency of X and uses that data to calculate the handheld controller's pose. In this example, the update process requires a new magnetic field signal to be transmitted and received at each of the marked instances 610(*a-d*). Using this transmission data, the pose computing module 140 can accurately determine where the handheld controller 520 is and how it is oriented with respect to the HMD 510.

In at least one embodiment, the mixed-reality system 100 may determine that updating at this rate will unnecessarily stress the mixed-reality system 100. As such, instead of transmitting at frequency X (depicted FIG. 5), the mixed-reality system causes the magnetic sensor device within the handheld controller 520 to transmit at a reduced rate. The reduced transmit rate results in relatively low-accuracy sensor readings that are then augmented with data collected by other spatial input devices, as explained above.

Figure 7:
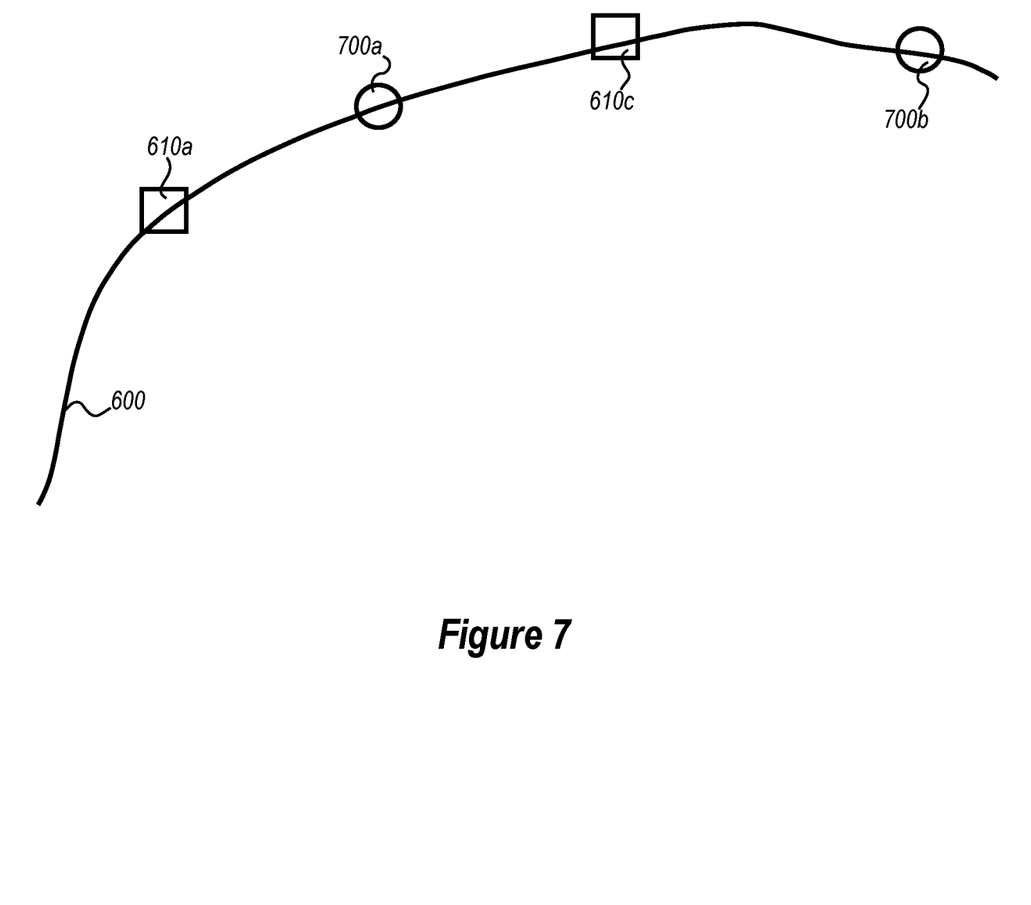
FIG. 7 illustrates a chart of another embodiment of a transmission rate that a device follows when transmitting a magnetic field signal.

For example, FIG. 7 illustrates a chart of an embodiment of a transmission rate that a device follows when transmitting a magnetic field signal. The transmission rate depicted in FIG. 7 is a reduced rate relative to the rate depicted in FIG. 6. In FIG. 7, each transmission by the magnetic sensor device in the handheld controller 520 is visualized as a square 610a, 610c. In contrast, the circles 700a, 700b represent sensor readings gathered by another spatial input device. For example, circles 700a and 700b may represent times and locations when an IMU gathered pose data along the motion path 600 of the handheld controller 520. The pose data gathered by the magnetic sensor device is augmented with the pose data gathered by the IMU to create accurate estimated poses along the motion pathway 600.

In at least one embodiment, as depicted in FIG. 7, the mixed-reality system switches the magnetic sensor device between a high-power mode and a low-power mode as the magnetic sensor device travels along the motion path 600. In particular, the high-power modes may be activated at points 610a and 610c. Additionally, in at least one embodiment, the mixed-reality system 100 also switches the IMU between high-power and low-power modes as the handheld controller 520, which contains both the magnetic sensor device and the IMU, moves along the motion path 600. In particular, the mixed-reality system 100 can switch the IMU between a high-power mode and a low-power mode at a rate that compliments the reduced rate of the magnetic sensor device. For instance, the IMU can be switched to a high-power mode at points 700a and 700b, when the magnetic sensor device is in a low-power mode. The IMU can then be switched to a low-power mode at points 610a and 610c, when the magnetic sensor device is in a high-power mode.

Now, an exemplary method of dynamically switching modes within a magnetic sensor device will be described with respect to FIG. 8.

Figure 8:
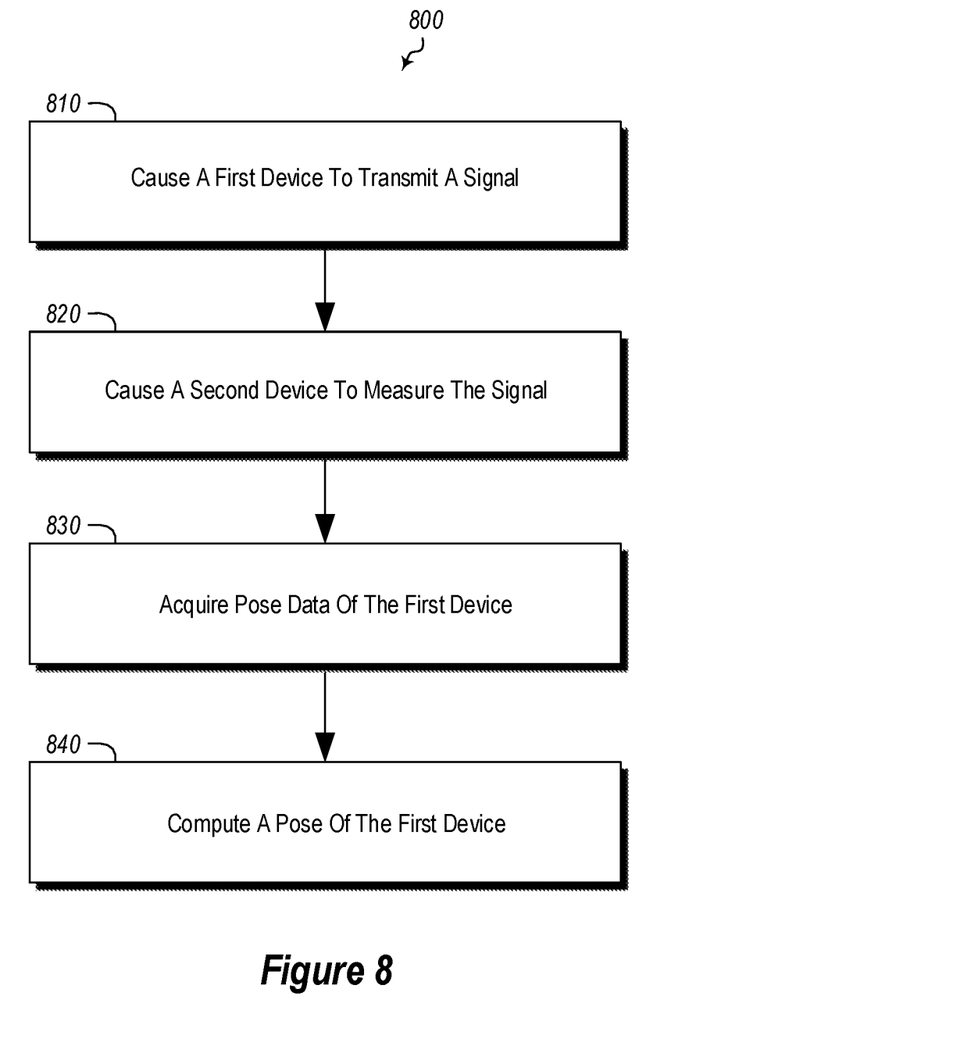
FIG. 8 illustrates steps in an exemplary method that can be followed to augment update data with IMU data to provide an accurate pose estimation.

FIG. 8 illustrates steps in an exemplary method 800 that can be followed to augment spatial sensor device readings. For example, FIG. 8 illustrates that method 800 includes an act 810 for causing a first device to transmit a signal. Act 810 comprises causing a first spatial input device to transmit a tracking signal at a reduced rate. For example, as depicted and described with respect to FIG. 5-7, the mixed-reality system 100 causes the magnetic sensor device within the handheld controller 520 to reduce its transmit rate.

Method 800 also includes an act 820 for causing a second device to measure the signal. Act 820 comprises causing a second spatial input device to determine a measurement of the tracking signal. For example, as depicted and described with respect to FIG. 2-4, a magnetic sensor device within the HMD 210 measures a tracking signal (i.e., magnetic field signal) emitted by the magnetic sensor device that is integrated within the handheld controller 220.

Additionally, method 800 includes an act 830 for acquiring pose data of the first device. Act 830 comprises use another spatial input device to acquire pose data of the first spatial input device. For example, as depicted and described with respect to FIG. 5, while the handheld controller 520 is within the camera's field-of-view 550, the camera can acquire pose data from the handheld controller 520.

Further, method 800 includes an act 840 for computing a pose of the first device. Act 840 comprises computing a pose of the first spatial input device by at least augmenting the measurement of the tracking signal with the pose data acquired by the other spatial input device. For example, as depicted and described with respect to FIG. 1, the pose computing module 140 uses multiple sensor readings to augment data received from a given spatial input device. The multiple sensor readings may be augmented within a Kalman filter.

Figure 9:
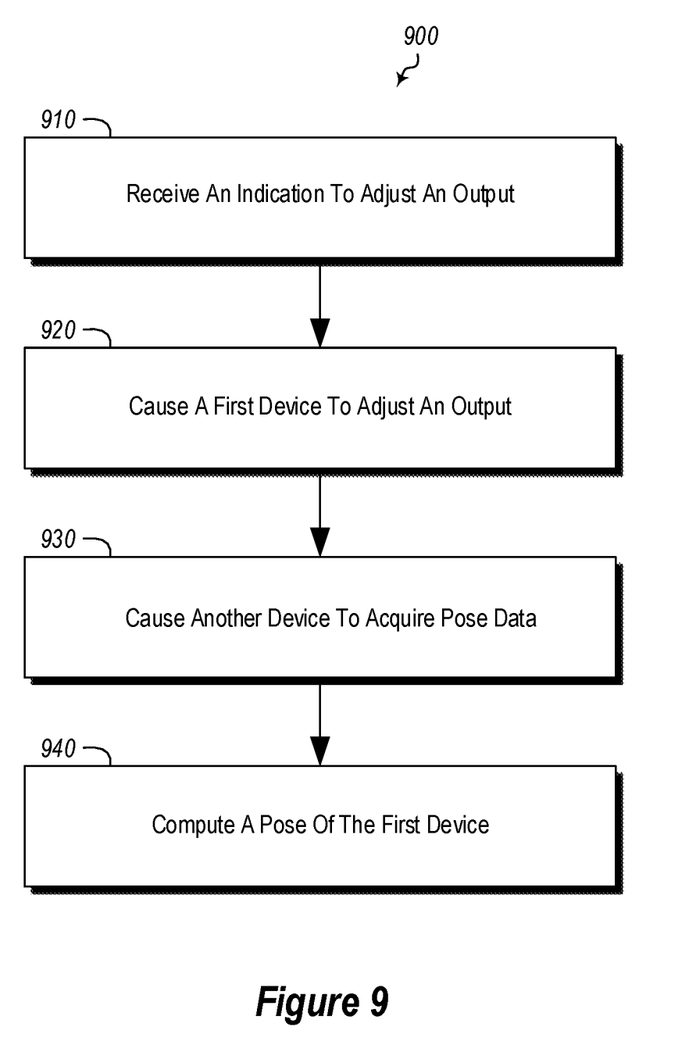
FIG. 9 illustrates steps in an exemplary method that can be followed to augment update data with IMU data to provide an accurate pose estimation.

FIG. 9 illustrates steps in an additional exemplary method 900 that can be followed to augment spatial sensor device readings. For example, FIG. 9 illustrates that method 900 includes an act 910 for receiving an indication to adjust an output. Act 910 comprises receiving an indication that adjusting an output associated with a first spatial input device will improve a system characteristic. For example, as depicted and described with respect to FIG. 1, the mixed-reality system 100 can receive an indication that the battery life of a particular spatial input device is running low.

Method 900 also includes an act 920 of causing a first device to adjust an output. Act 920 comprises causing the first spatial input device to operate at an adjusted output. For example, as depicted and described with respect to FIG. 5-7, the mixed-reality system 100 causes the magnetic sensor device within the handheld controller 520 to reduce its transmit rate.

Additionally, method 900 includes an act 930 for causing another device to acquire pose data. Act 930 comprises causing another spatial input device to acquire pose data of the first spatial input device. For example, as depicted and described with respect to FIG. 5, while the handheld controller 520 is within the camera's field-of-view 550, the camera can acquire pose data from the handheld controller 520.

Further, method 900 includes an act 940 for computing a pose of the first device. Act 940 comprises computing a pose of the first spatial input device by at least augmenting the measurement of the tracking signal with the pose data acquired by the other spatial input device. For example, as depicted and described with respect to FIG. 1, the pose computing module 140 uses multiple sensor readings to augment data received from a given spatial input device. The multiple sensor readings may be augmented within a Kalman filter.

Accordingly, described herein are embodiments related to wearable, mixed-reality computing systems, methods, and computer-readable media that prolong battery life by augmenting transmission data with data from other spatial input device to provide reliable and accurate update data. The system may include various components that are configured to perform the processes outlined above. For instance, the system might include a transmitter component that coordinates the transmission of the magnetic field signal. Further, the system might include a receiver component that coordinates the receipt of the magnetic field signal. The system might also include a coordination component that facilitates the coordination between the various on-body devices via the secondary communication channel.

Accordingly, described herein are embodiments related to wearable, mixed-reality computing systems, methods, and computer-readable media that enable an on-body device to dynamically switch operating modes. The systems may include various components that are configured to perform the processes outlined above. For instance, the system might include a transmitter component that coordinates the transmission of the magnetic field signal. Further, the system might include a receiver component that coordinates the receipt of the magnetic field signal. The system might also include a coordination component (which uses the secondary communication channel to coordinate communications between the on-body device and the base station).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as the so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for augmenting spatial sensor device readings, the system comprising:
   one or more processors; and
   one or more computer-readable hardware storage devices having stored thereon executable instructions that when executed by the one or more processors configure the computer system to perform at least the following:
   cause a first spatial input device to transmit a tracking signal at a reduced rate;
   cause a second spatial input device to determine a measurement of the tracking signal;
   use a third spatial input device to acquire pose data of the first spatial input device; and
   compute a pose of the first spatial input device by at least augmenting the measurement of the tracking signal with the pose data acquired by the third spatial input device.

2. The computer system as recited in claim 1, wherein:
   the first spatial input device comprises a first magnetic sensor device; and
   the second spatial input device comprises a second magnetic sensor device.

3. The computer system as recited in claim 2, wherein the third spatial input device comprises an inertial measurement unit that is coupled to the first magnetic sensor device.

4. The computer system as recited in claim 2, wherein the third spatial input device comprises a camera.

5. The computer system as recited in claim 1, wherein causing the first spatial input device to transmit the tracking signal at a reduced rate comprises switching the first spatial input device between a second high-power mode and a second low-power mode.

6. The computer system as recited in claim 5, wherein using the third spatial input device to acquire pose data of the first spatial input device comprises:
   switching the third spatial input device between a first high-power mode and a first low-power mode at a particular rate that compliments the reduced rate, wherein the particular rate compliments the reduced rate by switching the third spatial input device into the first high-power mode at least during periods when the spatial input device is not transmitting.

7. The computer system as recited in claim 6, wherein the executable instructions include instructions that are executable to configure the computer system to:
   receive a request for low-accuracy sensor readings; and
   cause the first spatial input device to transmit the tracking signal at the reduced rate.

8. The computer system as recited in claim 1, wherein switching the first spatial input device to the second low-power mode comprises turning the first spatial input device off.

9. The computer system as recited in claim 1, wherein the executable instructions include instructions that are executable to configure the computer system to:
   determine a single-to-noise ratio associated with the tracking signal; and
   when the single-to-noise ratio is below a predetermined threshold, then cause the first spatial input device to transmit the tracking signal at the reduced rate.

10. The computer system as recited in claim 1, wherein the executable instructions include instructions that are executable to configure the computer system to:
    determine a motion type that is being asserted on the first spatial input device; and
    based upon the determined motion type, cause the first spatial input device to transmit the tracking signal at the reduced rate.

11. A method for augmenting spatial sensor device readings comprising:
    receiving an indication that adjusting an output associated with a first spatial input device will improve a system characteristic;
    causing the first spatial input device to operate at an adjusted output;
    causing a second spatial input device to determine a measurement of the first spatial input device;
    causing a third spatial input device to acquire pose data of the first spatial input device; and
    computing a pose of the first spatial input device by at least augmenting measurements determined from the first spatial input device with the pose data acquired by the third spatial input device.

12. The method as recited in claim 11, wherein:
    the first spatial input device comprises a first magnetic sensor device; and
    the second spatial input device comprises an inertial measurement unit that is coupled to the first magnetic sensor device.

13. The method as recited in claim 12, wherein causing the first spatial input device to operate at an adjusted output comprises:
    causing the first magnetic sensor device to emit magnetic field signals at a reduced power level relative to its previous output power.

14. The method as recited in claim 12, further comprising:
    wherein the received indication comprises a notification regarding one or more other magnetic sensor devices within a common operating environment as the first magnetic sensor device, wherein the one or more other magnetic sensor devices are emitting magnetic field signals;
    based upon the received indication, determining that an availability of communication bandwidth associated magnetic field signals is below a threshold;
    based upon the determined availability of communication bandwidth, causing the first magnetic sensor device to transmit the tracking signal at the reduced rate.

15. The method as recited in claim 11, wherein receiving the indication that adjusting the rate associated with the first spatial input device will improve the system characteristic comprises:

receiving a communication from a mixed-reality processing unit, through a secondary channel, wherein the communication comprises a request for a particular level of sensor sensitivity; and based upon the particular level of sensor sensitivity, calculating an adjusted output in the form of a particular rate.

16. The method as recited in claim 15, wherein the particular level of sensor sensitivity is generated by a mixed-reality software application based upon current pose tracking needs within the mixed-reality software application.

17. The method as recited in claim 11, wherein the third spatial input device comprises a camera.

18. The method as recited in claim 17, wherein causing the third spatial input device to acquire pose data of the first spatial input device comprises tracking a current location of the first spatial input device using the camera.

19. The method as recited in claim 11, wherein the system characteristic comprises a battery life.

20. A computer system for augmenting spatial sensor device readings, the system comprising:

one or more processors; and one or more physical computer-readable storage media having stored thereon executable instructions that when executed by the one or more processors configure the computer system to perform at least the following:

cause a first spatial input device to transmit a tracking signal at a reduced rate;

cause a second spatial input device to determine a measurement of the tracking signal;

use a third spatial input device to acquire pose data of the first spatial input device; and compute a pose of the first spatial input device by at least augmenting the measurement of the tracking signal with the pose data acquired by the third spatial input device.

* * * * *